United States Patent
Kim

(10) Patent No.: US 9,435,420 B2
(45) Date of Patent: Sep. 6, 2016

(54) YOKE CLEARANCE COMPENSATOR OF VEHICLE

(71) Applicant: HYUNDAI MOBIS CO., LTD., Seoul (KR)

(72) Inventor: Tae Yoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/527,570

(22) Filed: Oct. 29, 2014

(65) Prior Publication Data

US 2015/0122064 A1    May 7, 2015

(30) Foreign Application Priority Data

Nov. 4, 2013    (KR) .................... 10-2013-0132770

(51) Int. Cl.
 *F16H 55/28*    (2006.01)
 *B62D 3/12*    (2006.01)

(52) U.S. Cl.
 CPC .............. *F16H 55/283* (2013.01); *B62D 3/123* (2013.01); *Y10T 74/19623* (2015.01)

(58) Field of Classification Search
 CPC ................ Y10T 74/1967; Y10T 74/196263; B62D 3/123; B62D 5/0409; B62D 3/00; B62D 3/02; B62D 3/12; B62D 3/126; F16H 55/283; F16H 55/24; F16H 55/26; F16H 55/28; F16H 2055/281
 USPC ............ 74/422, 409, 388 PS, 498, 396, 440, 74/496, 568 R; 280/93.514, 779, 93.515; 180/400; 403/361
 See application file for complete search history.

(56) References Cited

U.S. PATENT DOCUMENTS

| | | | | |
|---|---|---|---|---|
| 7,487,984 B1* | 2/2009 | Lemont, Jr. | ............ | B62D 3/123 280/93.514 |
| 7,930,951 B2* | 4/2011 | Eickholt | ................ | B62D 3/123 74/388 PS |
| 8,256,315 B2* | 9/2012 | Song | ...................... | B62D 3/123 280/93.51 |
| 8,327,731 B2* | 12/2012 | Sung | ...................... | B62D 3/123 74/388 PS |
| 8,443,689 B2* | 5/2013 | Kawakubo | ............. | B62D 3/123 74/422 |
| 8,465,034 B2* | 6/2013 | Heo | ........................ | B62D 3/123 280/779 |
| 8,511,191 B2* | 8/2013 | Kawakubo | ............. | B62D 3/123 280/93.514 |
| 8,794,093 B2* | 8/2014 | Bareis | .................... | B62D 3/123 74/388 PS |
| 2003/0074996 A1* | 4/2003 | Camp | .................... | B62D 3/123 74/422 |
| 2005/0040170 A1* | 2/2005 | Hagano | .............. | B60K 15/0406 220/304 |
| 2009/0223314 A1* | 9/2009 | Eickholt | ................ | B62D 3/123 74/422 |

(Continued)

FOREIGN PATENT DOCUMENTS

DE    102011051960 A1 *   1/2013    ............ F16C 35/067
KR       10-0562579 B1      3/2006

*Primary Examiner* — David M Fenstermacher
*Assistant Examiner* — Leonard J Archuleta
(74) *Attorney, Agent, or Firm* — Knobbe Martens Olson & Bear LLP

(57) ABSTRACT

A yoke clearance compensator of a vehicle may include: a support yoke for supporting a rack bar; a yoke plug coupled to the support yoke through an elastic part and having a cavity formed therein; a pressurizing unit installed in the cavity of the yoke plug and providing a pressurizing force to the support yoke; and an end plug for fixing the pressurizing unit to the yoke plug.

7 Claims, 4 Drawing Sheets

(56) References Cited

U.S. PATENT DOCUMENTS

| | | | |
|---|---|---|---|
| 2013/0091979 A1* | 4/2013 | Bareis | B62D 3/123 74/568 R |
| 2013/0247696 A1* | 9/2013 | Imamura | F16H 55/283 74/30 |
| 2014/0020493 A1* | 1/2014 | Nakamura | F16H 57/021 74/422 |
| 2014/0126976 A1* | 5/2014 | Schmid | F16H 39/32 411/114 |
| 2014/0144264 A1* | 5/2014 | Raab | F16C 35/067 74/89.39 |
| 2014/0260719 A1* | 9/2014 | Bae | B62D 3/123 74/30 |
| 2015/0020619 A1* | 1/2015 | Son | B62D 3/123 74/30 |

* cited by examiner

YOKE CLEARANCE COMPENSATOR OF VEHICLE

CROSS-REFERENCES TO RELATED APPLICATIONS

The present application claims priority to Korean application number 10-2013-0132770, filed on Nov. 4, 2013, which is incorporated by reference in its entirety.

BACKGROUND

The present disclosure relates to a yoke clearance compensator of a vehicle, and more particularly, to a yoke clearance compensator of a vehicle, which is capable of freely setting the torsion angle of a torsion spring.

In general, a steering device refers to a device for changing the heading direction of a vehicle according to a driver's intention. The steering device changes the center of rotation around which the front wheels of the vehicle are rotated, and drives the vehicle in a direction desired by the driver.

SUMMARY

Embodiments of the present invention are directed to a yoke clearance compensator of a vehicle, which is capable of changing a torsion torque of a torsion spring.

In one embodiment, a yoke clearance compensator of a vehicle may include: a support yoke for supporting a rack bar; a yoke plug coupled to the support yoke through an elastic part and having a cavity formed therein; a pressurizing unit installed in the cavity of the yoke plug and providing a pressurizing force to the support yoke; and an end plug for fixing the pressurizing unit to the yoke plug.

The pressurizing unit may include a pushing member, a torsion spring, and a spider to provide a pressurizing force to the support yoke. The pushing member may be disposed at the support yoke, the spider may be disposed at the yoke plug, and the torsion spring may be disposed between the pushing member and the spider.

The elastic part may include a spring of which one end surrounds the circumference of the support yoke and the other end is installed on one surface of the yoke plug.

The elastic part may further include a flat spring disposed between the support yoke and the pushing member.

The torsion spring may have one end connected to the pushing member and the other end connected to the spider.

The spider may have a torsion spring fixing part formed on one surface thereof, and the torsion spring may be connected to the spider as the other end thereof is fixed to the torsion spring fixing part.

The spider may be coupled to the yoke plug in the cavity of the yoke plug.

The position at which the spider is coupled to the yoke plug in the cavity of the yoke plug may be changeable.

The position at which the spider is coupled to the yoke plug may be changed to adjust a torsion torque of the torsion spring of which the other end is fixed to the spider.

The position at which the spider is coupled to the yoke plug in the cavity of the yoke plug may be changed through rotation of the spider.

The spider may have a plurality of locking parts formed on the outer circumferential surface thereof, the yoke plug may have a plurality of grooves formed on the inner circumferential surface thereof, and the spider may be coupled to the yoke plug as the locking parts are inserted and fixed to the grooves.

The positions of the locking parts inserted and fixed to the grooves may be changed through rotation of the spider.

DESCRIPTION OF SPECIFIC EMBODIMENTS

Figure 1:
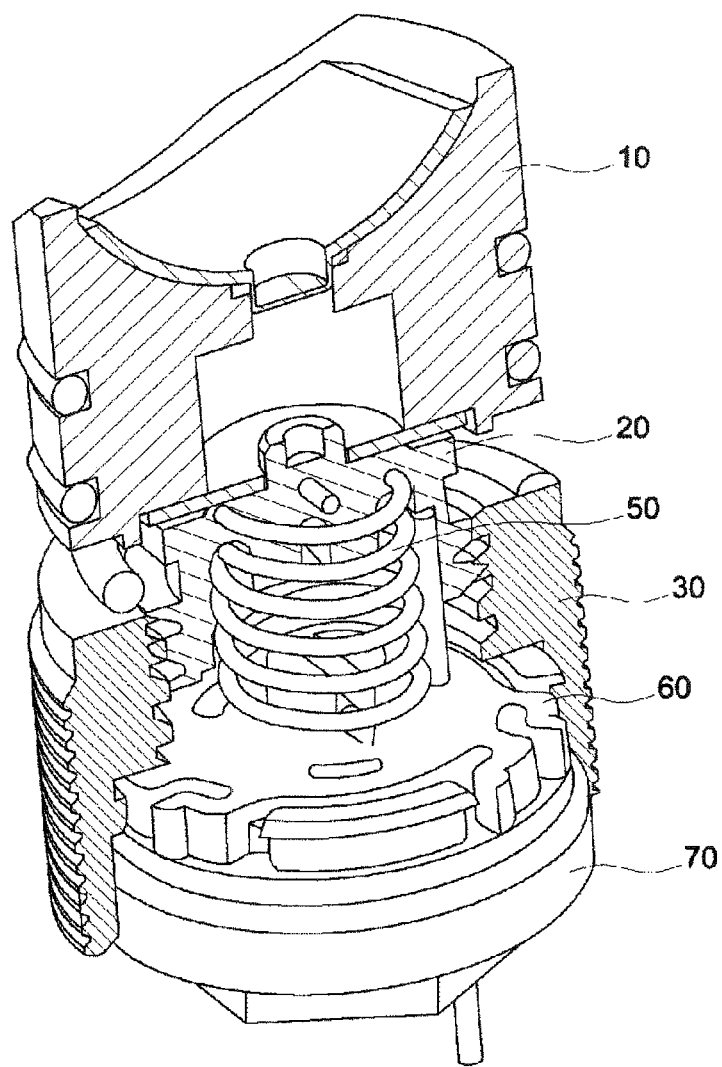
FIG. 1 is a cross-sectional view of a yoke clearance compensator of a vehicle in accordance with an embodiment of the present invention.

Hereafter, a yoke clearance compensator in accordance with an embodiment of the present invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Among various steering devices, a rack pinion-type steering device for a general vehicle includes a steering wheel disposed at a driver's seat, a steering shaft connected to the steering wheel, a steering column for fixing the steering shaft to the vehicle body, a gear box including a rack gear and a pinion gear which change a rotational force received from the steering shaft into a linear motion, and a rack bar having an inner ball joint formed at both ends thereof.

Among the components of the steering device, the rack bar is engaged with the pinion gear of the gear box, and switches a rotary motion into a linear motion. At this time, as the time elapses, a clearance may occur between the rack bar and the pinion gear due to abrasion or the like. In order to compensate for such a clearance, a yoke clearance compensator is installed on the rear surface of the rack bar. The yoke clearance compensator supports the rack bar and the pinion gear such that the rack bar and the pinion gear are more effectively attached to each other.

In general, the yoke clearance compensator is formed to be contacted with the rear surface of the rack bar, and includes a support yoke, a torsion spring, a yoke plug and the like. The support yoke is formed to have a semi-circular groove, the torsion spring is installed to closely engage the rack bar with the pinion gear by applying a predetermined pressure to the support yoke, and the yoke plug is installed to support the torsion spring.

Since a torsion torque of the torsion spring installed to apply a predetermined pressure to the support yoke is constantly determined through a torsion spring constant, the torsion torque of the torsion spring cannot be changed before the torsion spring is replaced. Thus, it is not easy to install a torsion spring having a proper torsion torque depending on the positions of the rack bar and the pinion gear.

In the yoke clearance compensator in accordance with the embodiment of the present invention, a torsion torque of a torsion spring installed therein can be changed to a proper value by a user, without replacing the torsion spring. Thus, when the yoke clearance compensator is installed or when the torsion torque of the torsion spring is required to be changed during operation of a vehicle, the torsion torque of the torsion spring may be properly changed without replacing the torsion spring.

Figure 2:
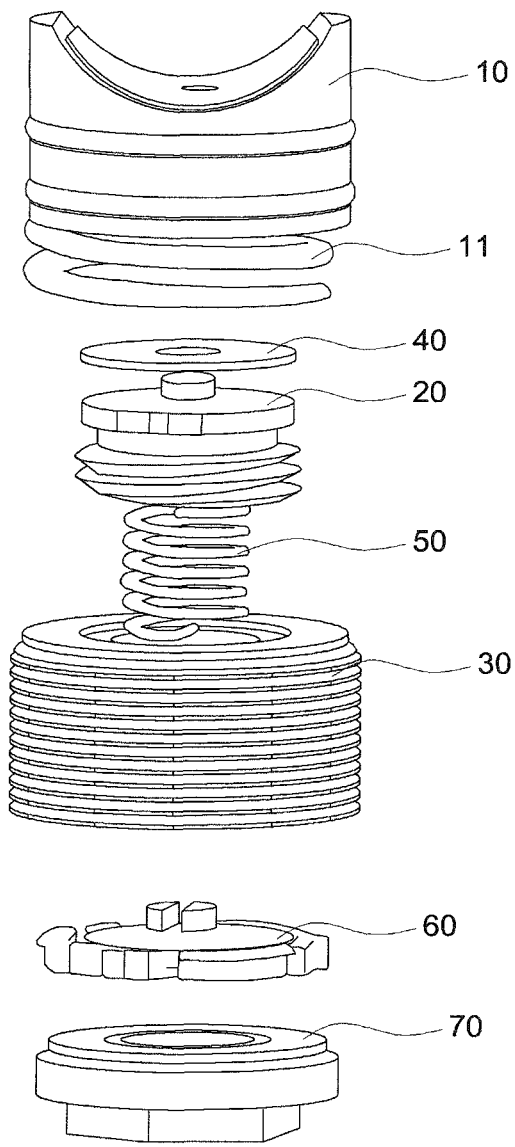
FIG. 2 is an exploded perspective view of the yoke clearance compensator of a vehicle in accordance with the embodiment of the present invention.

FIG. 1 is a cross-sectional view of a yoke clearance compensator 1 of a vehicle in accordance with an embodiment of the present invention, and FIG. 2 is an exploded perspective view of the yoke clearance compensator 1 of FIG. 1. Hereafter, the yoke clearance compensator 1 will be described in detail with reference to FIGS. 1 and 2.

The yoke clearance compensator 1 of a vehicle in accordance with the embodiment of the present invention may include a support yoke 10, a yoke plug 30, a pressurizing unit, and an end plug 70. The support yoke 10 may support a rack bar (not illustrated). The yoke plug 30 may be coupled to the support yoke 10 through an elastic part, and have a cavity formed therein. The pressurizing unit may be installed in the cavity of the yoke plug 30 so as to pressurize the support yoke 10. The end plug 70 may fix the pressurizing unit to the yoke plug 30.

The support yoke 10 may have a semi-circular groove formed at one side thereof so as to support the rack bar. The one side may indicate the top side in FIG. 1. The support yoke 10 may have the pressurizing unit installed at the other side thereof so as to pressurize the support yoke 10. The other side may indicate the bottom side in FIG. 1.

The support yoke 10 may be elastically connected to the yoke plug 30 through the spring 11. The spring 11 is one of elastic parts, and may be arranged in such a manner that one end thereof surrounds the circumference of the support yoke 10 and the other end thereof is disposed on one surface of the yoke plug 30. The one end of the spring 11 may indicate the upper end thereof in FIG. 1, the other end of the spring 11 may indicate the lower end thereof in FIG. 1, and the one surface of the yoke plug 30 may indicate the top surface thereof in FIG. 1. Thus, the support yoke 10 and the yoke plug 30 which are installed to be separated from each other may be elastically connected through the spring 11.

The yoke plug 30 may have a cavity formed therein, and the pressurizing unit to pressurize the support yoke 10 may be fixed and installed in the cavity. That is, the pressurizing unit may be disposed in the cavity of the yoke plug 30.

The pressurizing unit may have a function of pressurizing the support yoke 10. More specifically, the pressurizing unit may include a pushing member 20, a torsion spring 50, and a spider 60.

The bottom of the pushing member 20 may be connected to one end of the torsion spring 50, and the other end of the torsion spring 50 may be connected to one surface of the spider 60. The one end of the torsion spring 50 may indicate the upper end thereof in FIG. 2, the other end of the torsion spring 50 may indicate the lower end thereof in FIG. 2, and the one surface of the spider 60 may indicate the top surface thereof in FIG. 1. Specifically, the bottom of the torsion spring 50 may be fixed to a torsion spring fixing unit 61 formed on the top surface of the spider 60. As illustrated in FIG. 1, the pushing member 20 may have a space formed therein, and the torsion spring 50 may be installed in the space.

The spider 60 may be coupled and fixed to the inner circumferential surface of the yoke plug 30. Thus, since the bottom of the torsion spring 50 is fixed by the spider 60, the torsion spring 50 may provide an elastic pressurizing force in the upward direction where the top of the torsion spring 50 is disposed. When the torsion spring 50 provides a pressurizing force in the upward direction, the pushing member 20 connected to the torsion spring 50 may pressurize the support yoke 10 in the upward direction while pressurized upward by the torsion spring 50.

Between the pushing member 20 and the support yoke 10, a flat spring 40 serving as another elastic part may be additionally installed. Thus, in the present embodiment, the elastic part may include a spring 11 and the flat spring 40.

Figure 3:
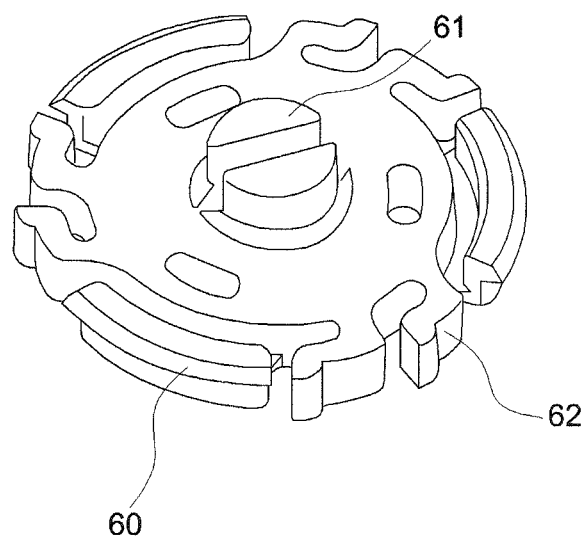
FIG. 3 illustrates a spider of the yoke clearance compensator of a vehicle in accordance with the embodiment of the present invention.

FIG. 3 illustrates the spider 60 coupled and fixed to the yoke plug 30. The torsion spring fixing part 61 to which the bottom of the torsion spring 50 is fixed may be formed on the top surface of the spider 60, and a plurality of locking parts 62 may be formed at a predetermined interval on the outer circumferential surface of the spider 60.

Figure 4A:
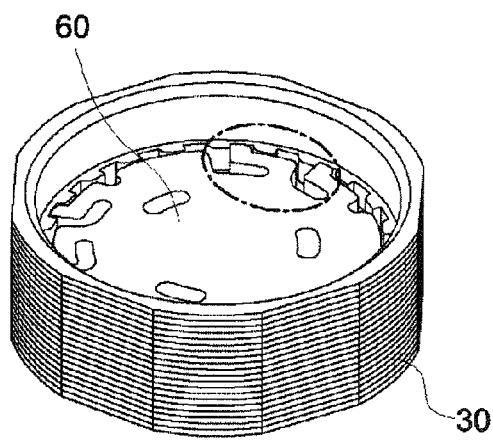
FIGS. 4A and 4B illustrate that the spider of the yoke clearance compensator of a vehicle in accordance with the embodiment of the present invention is coupled to a yoke plug.
Figure 4B:
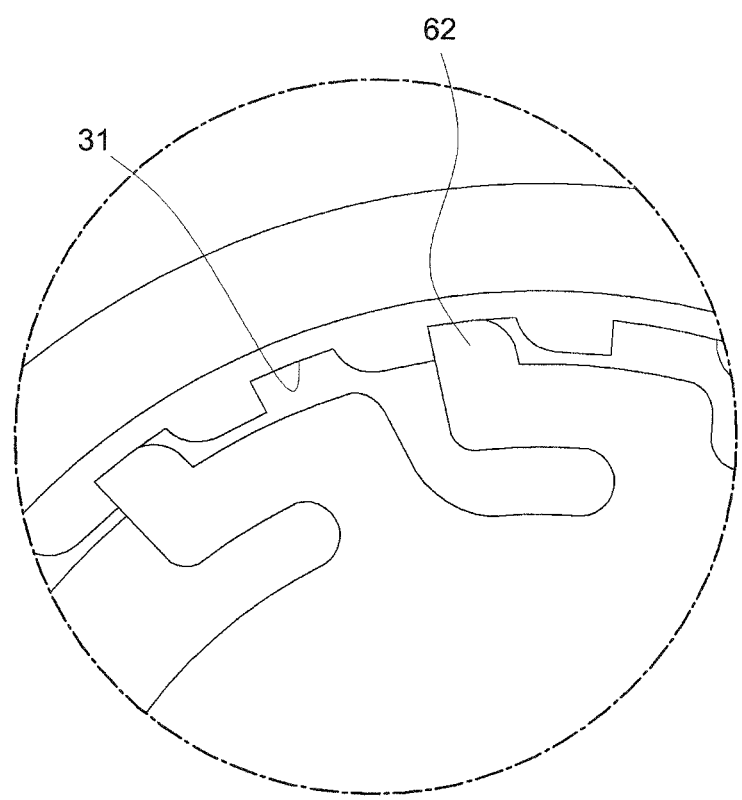

FIGS. 4A and 4B illustrate that the spider 60 is coupled and fixed to the inner circumferential surface of the yoke plug 30. Referring to FIGS. 4A and 4B, the plurality of locking parts 62 may be formed on the outer circumferential surface of the spider 60, and a plurality of grooves 31 may be formed on the inner surface of the yoke plug 30 so as to be located at positions corresponding to the locking parts 62. Thus, as the locking parts 62 of the spider 60 are inserted and fixed to the respective grooves 31 of the yoke plug 30, the spider 60 and the yoke plug 30 may be coupled to each other.

At this time, since the spider 60 includes the plurality of locking parts 62 and the yoke plug 30 includes the plurality of grooves 31, the positions of the grooves 31 into which the locking parts 62 are inserted may be changed through the rotation of the spider 60. Then, the spider 60 may be brought close to one side or isolated from the one side. The one side may indicate the top side in FIG. 1.

When the spider 60 is brought close to the top side, the torsion spring 50 of which the bottom is supported by the spider 60 may be further compressed to provide a larger pressurizing force toward the top side. Thus, the pushing member 20 receiving the pressurizing force from the torsion spring 50 may also pressurize the support yoke 10 upward through a larger force.

On the other hand, when the spider 60 is isolated from the top side, the pressurizing force applied to the top side may be reduced while the compression of the torsion spring 50 of which the bottom is supported by the spider 60 is reduced. Thus, the pushing member 20 receiving the pressurizing force from the torsion spring 50 may also pressurize the support yoke 10 upward through a smaller force.

As the positions of the locking parts 62 of the spider 60 inserted and fixed to the groove parts 31 of the yoke plug 30 are adjusted, that is, as the position (height) at which the spider 60 is fixed on the yoke plug 30 through the locking parts 62 and the grooves 31 is adjusted, the torsion torque of the torsion spring 50 fixed and coupled to the spider 60 may be adjusted to a desired value.

In accordance with the embodiment of the present invention, when the spider 60 and the yoke plug 30 are coupled, the position at which the spider 60 is coupled on the yoke plug 30 may be adjusted to change the torsion torque of the torsion spring 50.

Furthermore, an assembling pin may be additionally installed to more stably fix the pressurizing unit to the yoke plug 30.

In accordance with the embodiment of the present invention, since the torsion torque of the torsion spring can be adjusted through a simpler method, the torsion torque of the torsion spring may be adjusted without replacing the torsion spring.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A yoke clearance compensator of a vehicle, comprising:
   a support yoke configured to push a rack bar along an axis;
   a torsion spring having a first end portion and a second end portion;
   a pushing member fixed to the first end portion of the torsion spring and biased along the axis toward the support yoke for pushing the support yoke toward the rack bar along the axis;
   a torque adjuster being a separate piece from the pushing member and fixed to the second end portion of the torsion spring, wherein the torque adjuster is configured to rotate about the axis relative to the pushing member to adjust a torsion torque of the torsion spring such that force applied to the pushing member for pushing the support yoke is adjusted; and
   a yoke plug configured to engage with the torque adjuster to fix the torque adjuster's angular position relative to the yoke plug and the pushing member once the torsion torque is adjusted.

2. The yoke clearance compensator of claim 1, wherein the pushing member is engaged with the yoke plug, wherein the torque adjuster is configured to rotate relative to the yoke plug while maintaining its engagement with the yoke plug.

3. The yoke clearance compensator of claim 1, further comprising an external spring that surrounds a circumference of the support yoke and fixed to the yoke plug.

4. The yoke clearance compensator of claim 3, further comprising a flat spring disposed between the support yoke and the pushing member.

5. The yoke clearance compensator of claim 1, further comprising an end plug configured to engage with the yoke plug and abutting the torque adjuster.

6. The yoke clearance compensator of claim 1, wherein the yoke plug comprises a plurality of engaging notches, wherein the torque adjuster comprises a plurality of legs configured to engage with the engaging notches of the yoke plug.

7. The yoke clearance compensator of claim 1, wherein the torque adjuster comprises a plurality of locking legs, wherein the yoke plug comprises a plurality of grooves formed on its inner circumferential surface configured to receive the locking legs of the torque adjuster to fix its position relative to the yoke plug except when external force is applied to rotate the torque adjuster for adjusting the torsion torque.

* * * * *